INVENTOR.
William A. Geyger

United States Patent Office 3,403,329
Patented Sept. 24, 1968

3,403,329
FLUX-GATE MAGNETOMETER WITH
MAGNETIC AMPLIFIER
William A. Geyger, Takoma Park, Md., assignor to the
United States of America as represented by the Secretary of the Navy
Filed Nov. 29, 1963, Ser. No. 327,159
10 Claims. (Cl. 324—43)

The invention described herein may be manufactured and used by or for the Government of the United States of America for governmental purposes without the payment of any royalties thereon or therefor.

The present invention relates to a ring-core flux-gate magnetometer system having a single source of D.C. power for simultaneously and synchronously driving a ring-core flux-gate detector and a magnetic amplifier.

With the advent of artificial earth satellites a need for more simple, more sensitive, and highly reliable apparatus for measuring D.C. magnetic fields and detecting small changes of such fields arose. The prior art devices have served their intended purposes well, however, they do not satisfy the present-day needs, since the power consumption of some of the devices is excessive and the sensitivity of other devices is inadequate.

A typical prior art device is exemplified in U.S. Patent 3,040,248 issued June 19, 1962, to the present inventor which uses a stabilized A.C. voltage to power a flux-gate magnetometer, a magnetic amplifier, as well as other elements in the system. The A.C. voltage source utilizes a magnetic voltage stabilizer and transformer coupling to couple the voltage source to the various elements of the system. The substitution of a suitable D.C. to A.C. converter did not solve the problem, since the presence of saturable cores operating in the region of saturation materially affected the frequency of the converter A.C. source. Further difficulty was encountered in supplying an adequate converter since the power requirements of such a system are excessive for the intended purpose.

The present invention utilizes a ring-core flux-gate magnetometer to detect or measure a D.C. magnetic field, such as the earth's field, and to generate a second-harmonic voltage proportional to the D.C. magnetic field when the magnetometer is properly energized by an A.C. source. This saturating-core magnetometer performs the additional function of determining the actual oscillation frequency of a switching-transistor magnetic-coupled multivibrator. The second-harmonic output of the magnetometer is converted through a phase-sensitive demodulator into a polarity-reversible direct current which controls a push-pull type magnetic amplifier. The magnetic amplifier, although employing saturable cores, is operated in the unsaturated region of a hysteresis loop and is connected to the same power source as the magnetometer. The operation of the magnetic amplifier in the region of nonsaturation does not substantially affect the frequency of the multivibrator as determined by the parameters of the ring-core flux-gate element. The D.C. control voltage from the magnetometer varies the current supplied to the magnetic amplifier from the power source and the measurement of the polarity-reversible output current of the magnetic amplifier indicates the intensity of the magnetic field to be measured.

An object of the present invention is to provide a magnetometer system in which the effective sensitivity of the magnetometer is increased by amplifying the detected signal, while simultaneously reducing to a minimum the power consumption and the number of components.

Another object of the invention is to provide a magnetometer system in which the parameters of the magnetometer control the frequency of a D.C. to A.C. power supply while maintaining the parameters of a magnetic amplifier so they will not materially affect the frequency as determined by the flux-gate detector of the magnetometer system.

Still another object is to provide a polarity-reversible D.C. power source which simultaneously and synchronously powers both the flux-gate magnetometer and the magnetic amplifier.

A further object is to provide a compact, unitary, self-contained magnetometer system which is capable of both reliable and continued operation over long periods of time while completely unattended.

Other objects, advantages, and novel features of the invention will become apparent from the following detailed description of the invention when considered in conjunction with the accompanying drawings wherein.

Figure 1:
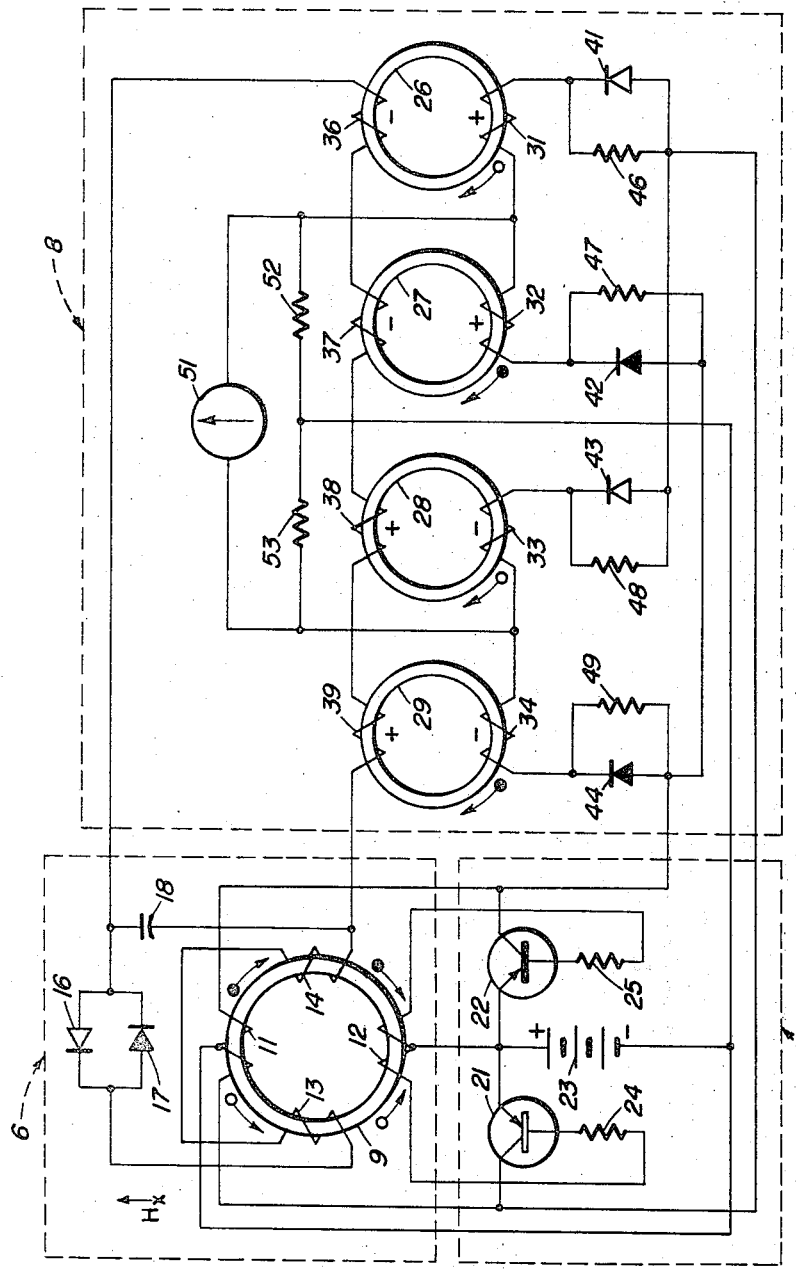
FIG. 1 is a schematic diagram of one embodiment of the magnetometer system.

Referring to FIG. 1 there is shown enclosed within dashed lines the magnetometer system 6, the switching-transistor system 7 and magnetic amplifier 8. Contained within the magnetometer system 6 is a ring-core flux-gate detector 9 constructed in the form of a toroid of saturable high-permeability material without an air-gap. Wound upon the core 9 are a pair of center tapped energizing windings 11 and 12, respectively, which are connected in series aiding relationship to the power source as will be explained hereinafter. Another pair of windings, detector windings 13 and 14, respectively, encircle the core 9 and are connected in a series flux subtracting relationship. In series with the detector windings are a pair of half-wave rectifiers or diodes 16 and 17 connected in parallel in a back-to-back relationship. In parallel with the series circuit of the detector windings and the half-wave rectifiers is a reservoir or smoothing capacitor 18.

Contained with the switching-transistor system 7 are a pair of PNP transistors 21 and 22, respectively, connected in a common emitter fashion to the positive terminal of a battery 23 which represents the power source. The negative terminal of the battery is connected in a parallel fashion to the collectors of transistors 21 and 22 through a center tapped connection of the primary winding 11. In a similar manner, the positive terminal of the battery is connected, through the center tap of the feedback winding 12 and a pair of bias resistors 24 and 25, to the base of transistors 21 and 22, respectively.

Contained within the self-saturating, push-pull-type magnetic amplifier 8 are four cores 26, 27, 28 and 29, respectively, each having a gate or output winding 31, 32, 33 and 34, respectively, and each having a D.C. control winding 36, 37, 38 and 39. During one half cycle of operation gate windings 32 and 34 of cores 27 and 29 are energized due to the conduction of the transistor 22 within multivibrator switching system 7. During the other half cycle gate windings 31 and 33 of cores 26 and 28 are energized due to the conduction of the transistor 21 within the multivibrator switching system 7. Each of diodes 41, 42, 43 and 44 has a resistor 46, 47, 48 and 49, respectively, connected in parallel across for the purpose of accomplishing the reset of the saturable-reactor elements during the half-cycle of nonconduction period of the diodes. Thus, through the cooperation of the diodes connected in a series circuit with a switching transistor of the power source and a core of the magnetic amplifier, the four cores are divided into two pairs which are alternately energized during each half cycle of operation. Each of the control windings 36–39 is connected in a series circuit to the demodulator of the magnetometer. The control windings on cores 27 and 29 are wound in series flux substracting relationship with respect to each other so that during one half cycle of operation the cores 27 and 29 simultaneously operate as a push-pull amplifier. In a similar manner the control windings of cores 26 and 28 are connected in series flux substracting relationship with respect to each other so that during the other half cycle of operation cores 26 and 28 simultaneously operate as a push-pull amplifier.

A center-zero-scale voltmeter 51 is connected across a pair of mixing resistors 52 and 53 to detect the difference in gate current flowing through each side of the push-pull amplifier. The resistor 52 is in series with gate windings 31 and 32 and resistor 53 is in series with gate windings 33 and 34.

Figure 2:
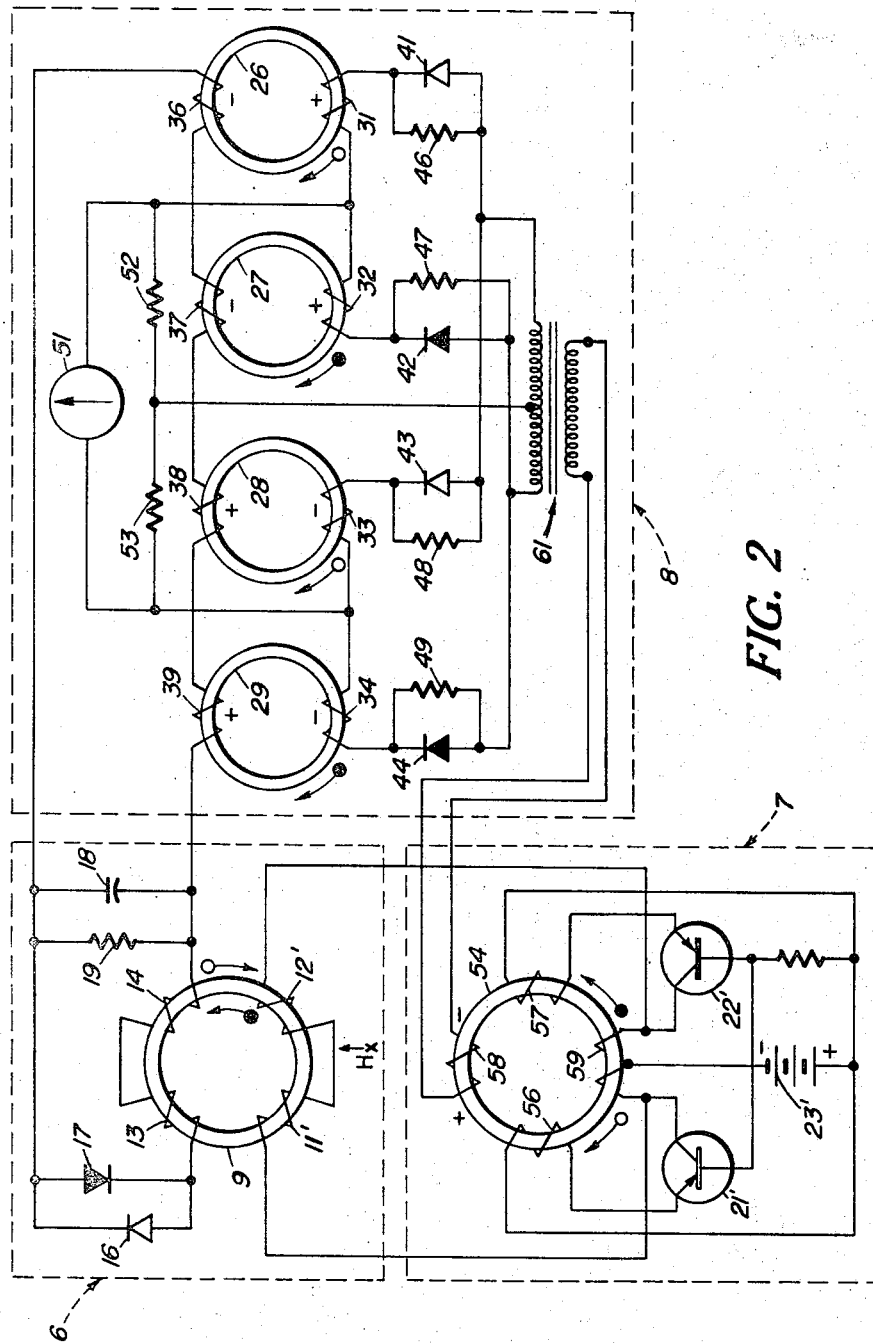
FIG. 2 is a schematic diagram of another embodiment of the magnetometer system.

Referring to FIG. 2 like components performing similar functions as in FIG. 1 have the same reference numeral as FIG. 1. The primary or energizing windings 11' and 12' are shown as a pair of windings but they also could be a single continuous toroidal winding.

Referring to the switching-transistor system 7 of FIG. 2, there is a saturable-core transformer 54 having primary windings 56 and 57 wound thereon. The saturable-core transformer 54 also has a pair of secondary windings 58 and 59 wound thereon. The battery 23' and the switching transistors 21' and 22' are connected in a common-base fashion. The primary windings, 56 and 57, are connected between the emitter and base of transistors 21' and 22', respectively. The other winding 59 has a center tap connected to the negative terminal of battery 23' and the two ends of the windings are connected to the collector of transistors 21' and 22', respectively. Connected in parallel fashion between the two collectors of transistors 21' and 22' are the series connected energizing windings 11' and 12' of the flux-gate core 9. The secondary winding 58 is connected to a transformer 61 within the magnetic amplifier 8 to supply alternating square wave pulses of opposite polarity to the magnetic amplifier 8. If desired the transformer 61 can be eliminated with the magnetic amplifier connected directly across the secondary winding 58 and the common return of magnetic amplifier 8 connected to a center tap (not shown) of secondary winding 58.

The operation of FIG. 1 will be explained assuming the notation that the inked-in components indicate those components operable during one-half cycle. The arrows with the darkened tails indicate the direction of flux produced during that same half-cycle. Conversely, the components which are not darkened and the arrows with the non-inked-in tails indicate the components operable and the flux produced during the other half-cycle of operation.

Assuming that transistor 22 is conducting, then one-half of both of the energizing coils 11 and 12 will be in a series circuit with the battery 23. Starting with positive terminal of battery 23 which is connected to the half portion of the energizing winding 12 by the center tap the series circuit proceeds through resistor 25 to the base of transistor 22 and then through to collector of transistor 22 to a half of the energizing winding 11 and returns from center tap of winding 11 to the negative terminal of the battery 23. While this is occurring the other half of the energizing winding 12 is acting as secondary winding to create the proper bias on transistor 21 to initiate conduction thereof, which commences upon saturation of transistor 22. Assuming now that transistor 21 is conducting, the operation is the reverse with a circuit formed through the other half of the energizing winding 12 through resistor 24 to the base of transistor 21 and then through the collector of transistor 21 and the other half of energizing winding 11 to return to the negative terminal of battery 23. The alternate energizing of the transistors 21 and 22 creates an alternating flux in the core 9 which alternates from one direction to the other as indicated by the arrows. Since the detector windings 13 and 14 are series-wound in flux-subtracting relationship, the secondary voltage generated in these windings should be equal and opposite if the windings are symmetrical. This is the case in the absence of any external magnetic field. If the core 12 were exposed to an external D.C. magnetic field, illustrated by $H_x$ in the figure, the flux through the detector windings 13 and 14 in one case would be strengthened and in the other case would be weakened to thus produce a voltage differential across the phase-sensitive demodulator consisting of diodes 16 and 17 with reservoir capacitor 18. As is well known, the D.C. magnetic field generates a voltage of the second harmonic and the phase-sensitive demodulator detects the phase relationship between the primary voltage and the second-harmonic voltage and produces an output D.C. voltage proportional to the D.C. magnetic field. This D.C. voltage is applied to the control windings 36–39 of the magnetic amplifier and, depending upon the polarity, creates either an adding flux in cores 26 and 27 and a subtracting flux in cores 28 and 29, or, if the polarity be reversed, the control windings create a subtracting flux in cores 26 and 27 and an adding flux in cores 28 and 29.

Returning now to the switching-transistor system 7 and assuming that transistor 22 is conductive, a voltage is applied to magnetic amplifier 8 to cause conduction of diodes 42 and 44. This conduction causes a current to flow through the mixing resistors 52 and 53, respectively, and to return to the negative terminal of the battery 23. If no signal current be applied to the control windings 36–39 of cores 26–29 of the magnetic amplifier 8, the currents flowing through the gate windings 32 and 34 will be equal and there will be no potential difference detected across resistors 52 and 53 since all the components within the circuit are symmetrical. However, if a signal current is flowing through control windings 36–39, due to a second-harmonic voltage produced by the flux of the magnetic field $H_x$ and detected by the core 9, then the current through the gate windings 32 and 34 will be different due to the series adding or subtracting, as the case may be, of the flux produced by both the control windings 37 and 39 and the windings 32 and 34 on cores 27 and 29, respectively. This difference in current in the gate windings 32 and 34 produces a voltage drop across the resistors 52 and 53 which is detected and measured by center-zero-scale voltmeter 51. Thus, in the absence of any magnetic field the entire circuit is completely balanced and no voltage is detected on voltmeter 51. In the presence of a magnetic field, denoted as $H_x$, a potential is created which varies the current through the gate windings 32 and 34 directly in accordance with the magnitude of the magnetic field, and the resulting voltage drop detected across the resistors 52 and 53 is in direct proportion to the strength of the magnetic field, $H_x$.

An important feature of the combination of the magnetometer 6, the switching-transistor system 7, and the magnetic amplifier 8 is the fact that the parameters of the windings upon the magnetometer core 9 control the switching rate of transistors 21 and 22 and thus determine the oscillation frequency of the multivibrator. This is due primarily to the fact that the core 9 is operated in saturation. The saturable cores 26–29 of the magnetic amplifier, however, are not operated in saturation, and even though connected across the switching transistors 21 and 22 they do not materially affect or substantially alter the oscillation frequency, as determined by the parameters of the flux-gate detector with magnetic core 9 and windings 11 and 12. The combination of the magnetic amplifier connected to the output of the magnetometer 6 greatly increases the sensitivity of the magnetometer since the weak signals are detected and the control voltage produced thereby is utilized as an input to vary the current in the gate windings 31–34 of this amplifier in direct proportion to the polarity-reversible D.C. control voltage appearing across the output terminals of the demodulator. Thus, the magnetic amplifier detects the output of the magnetometer system 6 and amplifies this voltage to a more readily measurable level. The circuitry of FIG. 1 thus utilizes a minimum of components as well as a minimum of power to simultaneously increase the sensitivity of the magnetometer while supplying all the power necessary for the entire system from a single D.C. power source.

The operation of the circuit in FIG. 2 is substantially identical to that in FIG. 1 with the main difference being in the utilization of two transformers 54 and 61 with unsaturated cores to accomplish more complete separation of the magnetic amplifier from the magnetometer. Due to the high efficiency of the unsaturated transformers, 54 and 61, the power requirements are not substantially increased. The operation of the switching-transistor system 7 as a common-base arrangement as compared to a common-emitter-type arrangement is a matter of choice and design.

The energizing windings 56 and 57 of the transformer 54 perform two functions; one function of energizing and producing the flux within the transformer 54 and the other function, as a secondary winding, of biasing the non-conducting transistor to the state of conduction. Assuming that transistor 22' is conducting, energizing winding 57 is generating a flux in the direction of the inked-in arrows and energizing winding 56 is creating a positive bias on the emitter of nonconducting transistor 21'. Transistor 21' then becomes conductive and energizing winding 56 generates flux in the direction of the arrow having the non-inked-in tail and energizing winding 57 acts to create a positive bias on the emitter of the then nonconducting transistor 22'. The secondary winding 59 is responsive to the flux generated in the transformer 54 to generate a square wave polarity reversible voltage for producing the necessary flux in the magnetometer 9 through the coils 12' and 11'. Since the transformer 54 is operating at nonsaturation and the magnetometer core 9 is operating in saturation, the parameters of flux-gate core 9 and associated primary windings 11' and 12' determine the oscillation frequency of the multivibrator, that is, the switching rate of transistors 21' and 22'. The secondary winding 58 operates as a normal secondary transformer winding to supply the square-wave voltages necessary to drive the magnetic amplifier as described hereinbefore. The frequency of operation remains the same as the parameters of the magnetometer core 9 with windings 11' and 12' determine the rate of switching since all of the other saturable cores in the magnetic amplifier and core 54 are not operated in the region of saturation. The transformer 61 operates as an ordinary transformer and also does not materially affect the A.C. switching rate of the power source 7 as determined by the magnetometer core 9.

The combination of the magnetic amplifier with the ring-core magnetometer increases the sensitivity of the magnetometer through the amplification provided by the magnetic amplifier while at the same time it does not materially increase the power requirements, since the magnetic amplifier is operated by the same A.C. power source as the ring core magnetometer. The operation of both the magnetometer and the magnetic amplifier from the same A.C. power source provides the necessary synchronization with the minimum number of components to thereby increase the efficiency and compactness of the unit. It also increases the stability of operation of the entire system.

Obviously many modifications and variations of the present invention are possible in the light of the above teachings. It is therefore to be understood that within the scope of the appended claims the invention may be practiced otherwise than as specifically described.

What is claimed is:
1. In a flux-gate magnetometer:
 (a) a saturable core operated in magnetic saturation having
  (1) means for generating a D.C. voltage output proportional to detected D.C. magnetic field when simultaneously energized by both said D.C. magnetic field and an A.C. magnetic field,
  (2) first means for simultaneously generating an A.C. magnetic field and controlling the switching rate of a D.C. power source,
 (b) a polarity reversible power source having
  (1) a source of D.C. power,
  (2) and switching means connecting between said D.C. source of power and said first means for alternately switching the polarity of D.C. power supplied to said first means,
 (c) and an amplifier producing an output proportional to the detected D.C. magnetic field having
  (1) control means connected to the D.C. voltage output of said generating means for varying the output of the amplifier,
  (2) and means connected to said switching means and to said control means for supplying an output varied in direct proportion to the detected D.C. magnetic field.
2. A flux-gate magnetometer system comprising:
 (a) a ring-core flux-gate magnetometer including
  (1) means for detecting a D.C. magnetic field,
  (2) means for determining the oscillation frequency of a polarity reversible D.C. source,
  (3) and means connected to said detector means for generating a D.C. control voltage proportional to the detected D.C. magnetic field,
 (b) means for supplying a source of polarity-reversible substantially D.C. voltage including
  (1) a D.C. power source,
  (2) and a switching means connected between said D.C. power source and said frequency determining means for reversing the polarity of said D.C. power source,
 (c) and a magnetic amplifier means having a pair of inputs connected to said generating means and said supplying means, respectively, and an output for varying the power supplied by said supply means as a function of the D.C. control voltage of said generating means whereby an output is produced which is indicative of the magnitude of the D.C. magnetic field.
3. In a flux-gate magnetometer:
 (a) means for detecting a second-harmonic voltage proportional to a substantially D.C. magnetic field including
  (1) a toroidal core of high magnetic permeability,
  (2) at least one energizing winding wound upon said core,
  (3) at least a pair of detecting windings series connected and wound upon said core in flux subtracting relationship,
  (4) a phase-sensitive demodulator connected in series with said detecting windings for detecting the second-harmonic voltage,
 (b) means connected in series with said energizing winding for converting a D.C. power source to a square wave A.C. source including
  (1) a source of D.C. power,
  (2) switching means connected between said D.C. power source and said energizing winding for sequentially alternating the direction of current flow from said D.C. power source through said energizing winding,
 (c) magnetic amplifier means connected between said phase sensitive demodulator and said switching means for amplifying the detected second harmonic voltage including
  (1) a first and a second pair of saturable cores each core having an energizing winding means connected through a respective diode to said switching means for alternately energizing said first and said second pair of saturable cores by a current from said D.C. power source,
  (2) control winding means wound upon each core of said magnetic amplifier means and connected in a series circuit to said demodulator for alter- nately varying the current in said energizing windings of said first and second pair of saturable cores in accordance with the detected second-harmonic voltage, (3) and a detector means connected to said energizing windings for continuously detecting and indicating the variation in said energizing windings of said first and said second pair of saturable cores.

4. Apparatus as recited in claim 3 wherein said phase-sensitive demodulator further comprises a pair of diodes connected in a parallel back-to-back relationship.

5. Apparatus as recited in claim 3 wherein said switching means further comprises a pair of PNP transistors connected as a common emitter circuit.

6. Apparatus as recited in claim 3 wherein said switching means further comprises a pair of PNP transistors connected as a common base circuit.

7. Apparatus as recited in claim 3 wherein each diode has a reset resistor connected in parallel with said diode.

8. Apparatus as recited in claim 3 wherein said control winding means within said first and said second pair of saturable cores is connected in a series flux subtracting circuit.

9. Apparatus as recited in claim 3 wherein said detector means further comprises an impedance of equal magnitude connected in series with the energizing windings of each core said first and said second pair of saturable-core windings and a voltmeter connected in parallel with said impedances for detecting any voltage drop across said impedances.

10. Apparatus as recited in claim 3 wherein said converting means further comprises unsaturated transformer means connected between said switching means, said energizing winding and the energizing winding means of said first and said second pair of saturable cores for distributing the converted D.C. power to and for isolating said energizing windings and said energizing means.

References Cited

UNITED STATES PATENTS 3,040,248    6/1962    Geyger _____ 324—43

RUDOLPH V. ROLINEC, *Primary Examiner.*

R. J. CORCORAN, *Assistant Examiner.*